United States Patent [19]
Mirzeabasov et al.

[11] Patent Number: 5,850,033
[45] Date of Patent: Dec. 15, 1998

[54] TARGET FOR SIMULATING BIOLOGICAL SUBJECTS

[76] Inventors: Timur Akhmedbekovich Mirzeabasov, G.Lomonosov, Oranienbaumsky PR., D.37, Korp. 1, KV. 339, Sankt-Peterburg, Russian Federation, 189510; Andrey Ivanovich Panteleev, G.Kolpino, UL.Proletarskaya, D.93, KV.66, Sankt-Peterburg, Russian Federation, 189630; Valentin Borisovich Sheikhetov, G.Pushkin, UL.Kominterna, D.13/52,KV.26, Sankt-Peterburg, Russian Federation, 189620; Vladimir Vladimirovich Shikurin, VL.Spirina, D.14, Korp.1, KV.614, Sankt-Peterburg, Russian Federation, 198320; Dmitry Olegovich Belov, Leninsky PR., D.117, Korp.1, KV.605, Sankt-Peterburg, Russian Federation, 198303; Vladimir Alekseevich Odintsov, PR. Vernadskogo, D.119, KV. 247, Moskow, Russian Federation, 117571

[21] Appl. No.: 827,396

[22] Filed: Mar. 27, 1997

Related U.S. Application Data

[63] Continuation of PCT/RU94/00283, Sep. 30, 1994.

[30] Foreign Application Priority Data

Sep. 30, 1994 [WO] WIPO .............. PCTRU9400283

[51] Int. Cl.[6] .................................. G01M 7/00
[52] U.S. Cl. .............. 73/12.01; 73/432.1; 73/866.5; 434/267
[58] Field of Search .............. 73/12.01, 432.1, 73/866.4; 434/262, 267, 269

[56] References Cited

U.S. PATENT DOCUMENTS

| | | | |
|---|---|---|---|
| 3,010,223 | 11/1961 | Alderson | 434/267 |
| 3,310,885 | 3/1967 | Alderson | 434/267 |
| 3,648,389 | 3/1972 | Melzian | 434/267 |
| 4,481,001 | 11/1984 | Graham et al. | 434/267 |
| 4,493,653 | 1/1985 | Robbins et al. | 434/262 |
| 4,759,718 | 7/1988 | Nobuta | 434/262 |
| 4,917,372 | 4/1990 | Zeitlin | 434/262 X |
| 4,921,256 | 5/1990 | Gearhart | |
| 5,104,328 | 4/1992 | Lounsbury | 434/267 X |
| 5,648,925 | 7/1997 | McKinney et al. | 73/866.4 X |

FOREIGN PATENT DOCUMENTS

| | | |
|---|---|---|
| 3515063 | 6/1986 | Germany. |
| 1567936 | 5/1980 | United Kingdom. |

OTHER PUBLICATIONS

Ballistic Resistance Of Police Body Armor, NIJ Standard 0101.02, Mar. 1995, P. 7 (cited on page 1).

Bruce, D. Ragsdale, M.D., & Arnold Josselson. Predicting Temporary Cavity Size from Radial Fissure Measurements in Ordnance Gelatin, Journal of Trauma, 1988, vol. 28, No. 1, Suppl. p. 5 (cited on page 1).

*Primary Examiner*—Ronald L. Biegel
*Assistant Examiner*—Paul D. Amrozowilz
*Attorney, Agent, or Firm*—Merchant, Gould, Smith, Edell, Welter & Schmidt, P.A.

[57] ABSTRACT

The invention is in the field of testing technologies, relating more particularly to equipment used in certification tests and in forensic investigations into dynamic mechanical effects upon biological subject. The target comprises a means to simulate a biological subject, which has the the form of blocks 1, 2, and 3 arranged consecutively, one after another. Each of the blocks 1, 2, and 3 comprises a simulating section in the form of a layer of a material, whose mechanical properties approximate those of the skin, muscle, or bone tissue, and a recording section in the form of a layer 5 of a colorant-containing material, a layer 6 of a cellular material, and two substrates 7, wherebetween is accomodated the layer 4 of the simulating section. Vulcanized rubber is used for the material to simulate the skin tissue, unvulcanized rubber for the material to simulate the muscle tissue, and textolite for the material to simulate the bone tissue. The target affords test results of higher reliability and simplifies the testing and data processing procedures.

4 Claims, 7 Drawing Sheets

TARGET FOR SIMULATING BIOLOGICAL SUBJECTS

FIELD OF THE INVENTION

This is a continuation of PCT/RU94/00283 application filed 30 Sep. 1994.

The present invention is in the field of testing technologies, relating more particulary to equipment used in certificftion tests and in forensic investigations into dynamic mechanical effects upon biological subjects.

PRIOR ART

Plasticine is at present the most widely used and basic material for targets employed in certification tests and forensic investigations. Specifically, a target in the form of a box accomodating a block of plaslicine is used in certification tests for body armor (Ballistic Resistance of Police Body Armor NIJ Standart 0101.02, March 1985, p.7). A dynamic mechanical effect upon a block of plasticine will leave a mark in the form of an indentation or cavity. Based on the depth and volume of the cavity, a judgment can be formed as to the severity of the injury inflicted upon the biological subject protected by the body armour.

Inasmush as plasticine is a plastic medium while biological tissues belong to the class of viscoelastoplastic media, the behavior of plasticine when exposed to a dynamic mechanical effect will differ essentially from that of the tissues of a biological subject, with the incident physical processes in such tissues being likewise appreciably different. Thus, plasticine fails to simulate the physical processes occuring in biological subjects when exposed to a dynamic mechanical effect, enabling but an indirect judgment thereof.

More closely approximating biological tissues in properties is gelatin. This is used in laboratory tests and in forensic investigations. Specifically, there is known a target comprising a block of gelatin, which is used experimentally for studying the interaction between a bullet and a biological subject simulator (Bruce, D., Ragsdale, M.D., and Arnold Josselson. Predicting Temporary Cavity Size from Radial Fissure Measurements in Ordnance Gelatin, J. of Trauma, 1988, vol. 28, No. 1, Suppl., p. 5). To record the incident physical processes, use is made of rapid filming (cinematography) in X-rays.

In its properties, gelatin is more similar to soft tissues. A block of gelatin will therefore permit an averaged simulation of an anatomical region in a biological subject that consists of soft tissues only. A target comprising a block of gelatin will have no means for recording the physical processes incident to a dynamic mechanical effect so that a complicated set of equipment is required to record these. Gelatin blocks have to be made directly before testing, considering that water will evaporate from the gelating to cause a change in the proporties thereof.

The present invention is based upon the objective of providing a target construction, wherein the means to simulate a biological subject would be realized in a manner such as to enable simulation of skin, muscle, and bone tissues with concurrent recording of the physical processes therein incident to exposure to a dynamic mechanical effect, so that more reliable test results might be achieved, and testing and data processing procedures simplified.

DISCLOSURE OF THE INVENTION

The objective as stated above is achieved by providing a target comprising a means to simulate a biological subject, wherein the principal novel feature is that said means comprises a set of blocks to simulate the skin, muscle, and tissues, said blocks being arranged consecutively, one after another, and each comprising a recording section composed of a layer of colorant-containing material, a layer of a callular material, and two substrates and a simulating section arranged in between said substrates and containing a layer of a material whose mechanical properties match those of the skin, muscle, or bone tissues.

This solution is capable of providing simulation of the behaviour of the shin, muscle, and bone tissues when exposed to a dynamic mechanical effect and concurrent recording of the traces left by the physical processes occurring in the simulating sections of the target blocks. The traces are recorded on the substrates of the recording section of each of the blocks, in the form of imprints, circular walls, radial and circular fissures, and punctures. Based on the size of the imprint, the maximum values are determined of the parameters of the longitudinal compressoin wave. Based on the maximum dimensions of the radial and circular fissures and those of the circular walls, the stressed-strained condition of the medium is determined, as well as the maximum value of radial displacements of the temporary pulsating cavity. The shape and orientation of the punctures define the position of the wounding missile in passing the section in point. Thus, the totality of said traces helps reconstruct a realistic picture of the dynamic mechanical effect upon the biological subject simulated.

Another novel feature is that vulcanized rubber is used for the material to simulate the skin tissue.

This solution is convenient in that vulcanized rubber has mechanical properties more closely approximating those of the skin tissue.

Still another novel feature is that unvulcanized rubber is used for the material to simulate the muscular tissues.

This solution is convenient in that unvulcanized rubber has mechanical properties more closely approximating those of the muscular tissue.

A further novel feature is that textolite is used for the material to simulate the bone tissue.

This solution is convenient in that textolite has mechanical properties more closely approximating those of the bone tissue.

In the following, the invention is made more fully apparent through a detailed description the best embodiments thereof, with due references to the accompanying drawings.

BEST MODE TO CARRY THE INVENTION INTO EFFECT

Figure 1:
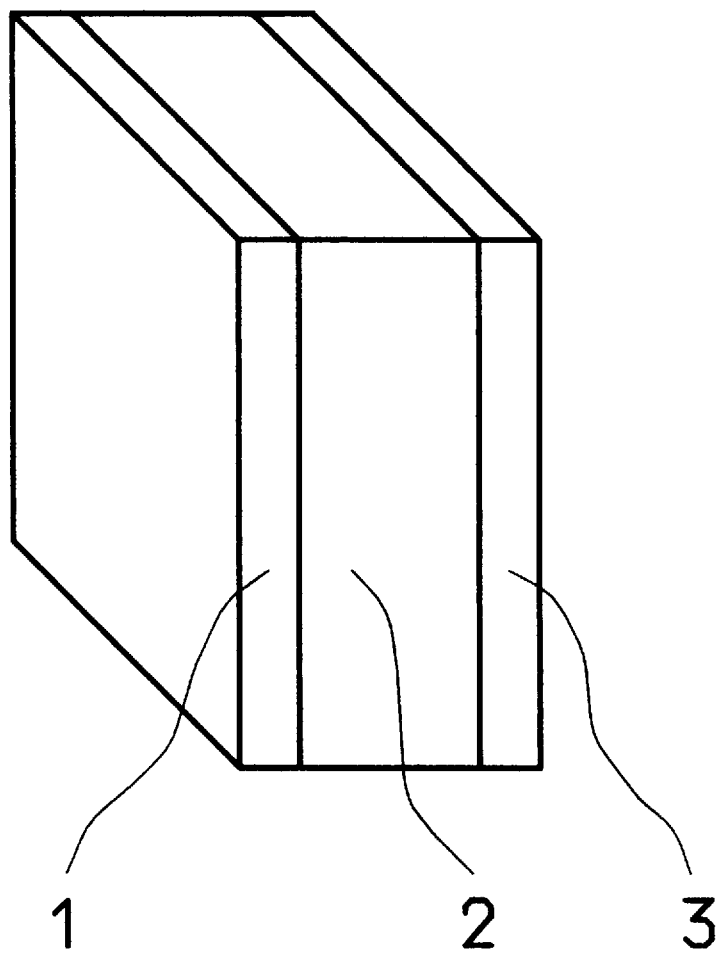
FIG. 1 is a schematic illustration of the target according to the invention, in axonometric projection.
Figure 2:
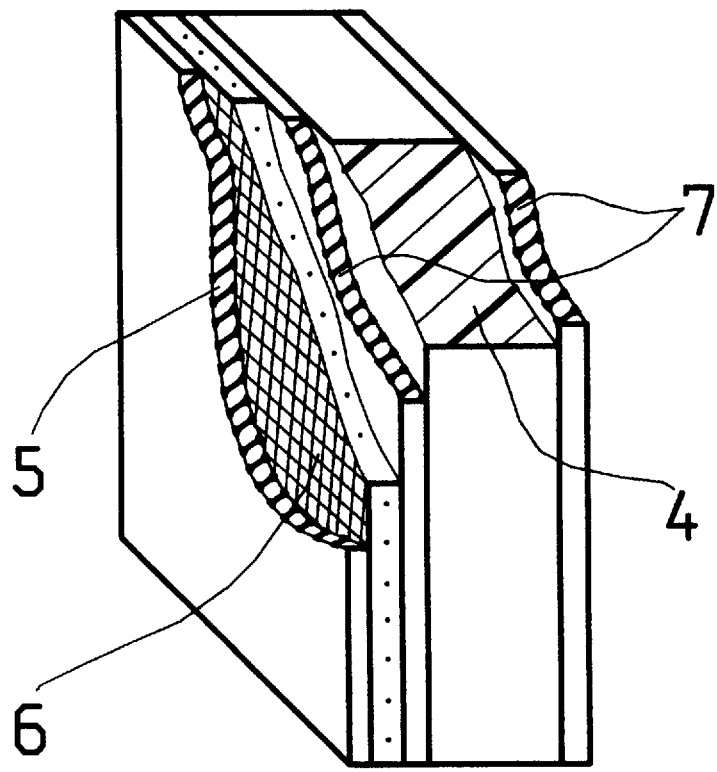
FIG. 2 is a typical target block to simulate the skin, muscle, or bone tissue, in axonometric projection.
Figure 3:
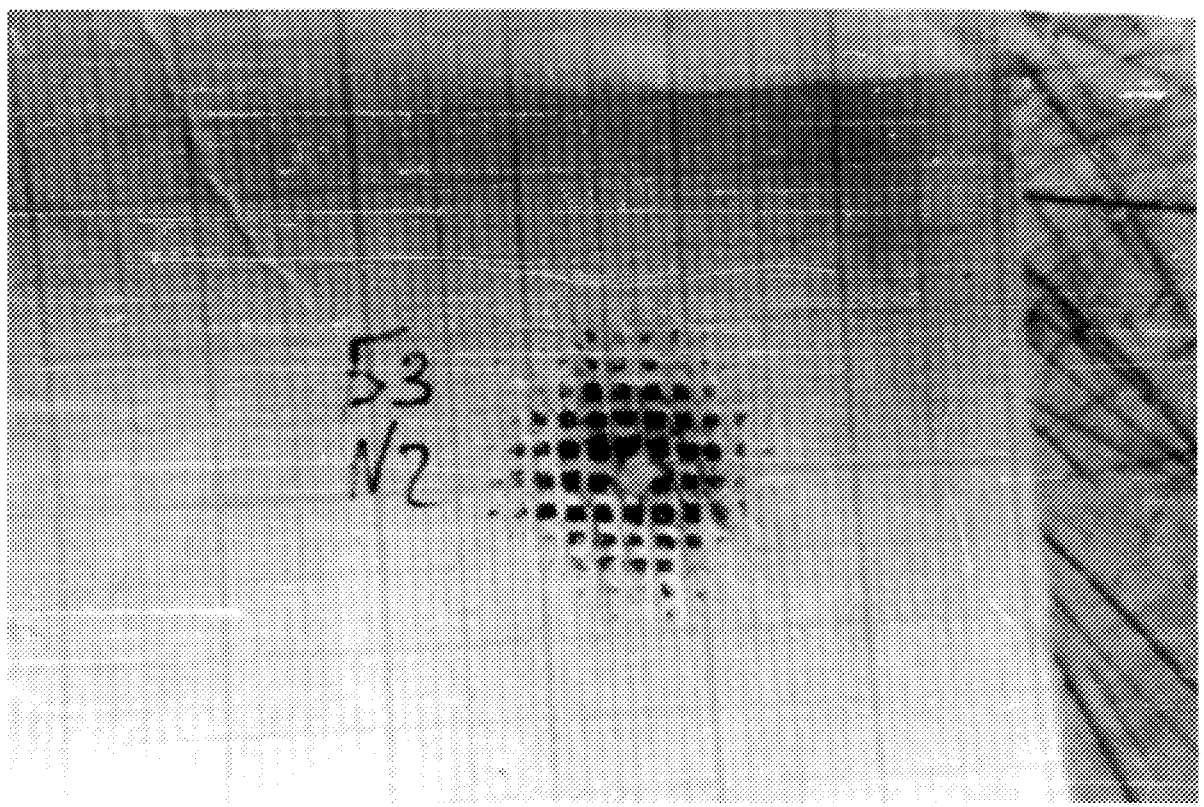
FIG. 3 is a photograph showing an imprint and a puncture.
Figure 4:
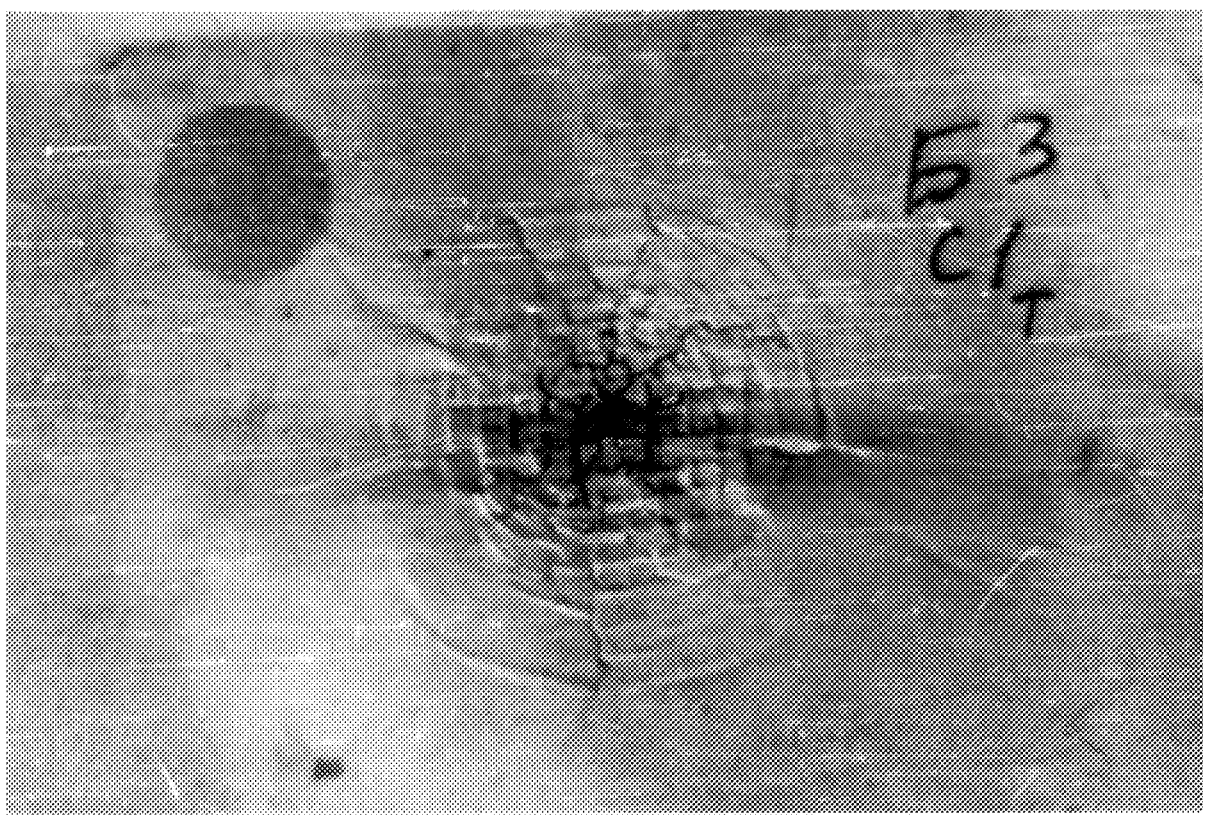
FIG. 4 is a photograph showing a system of circular and radial fissures and circular walls.
Figure 5:
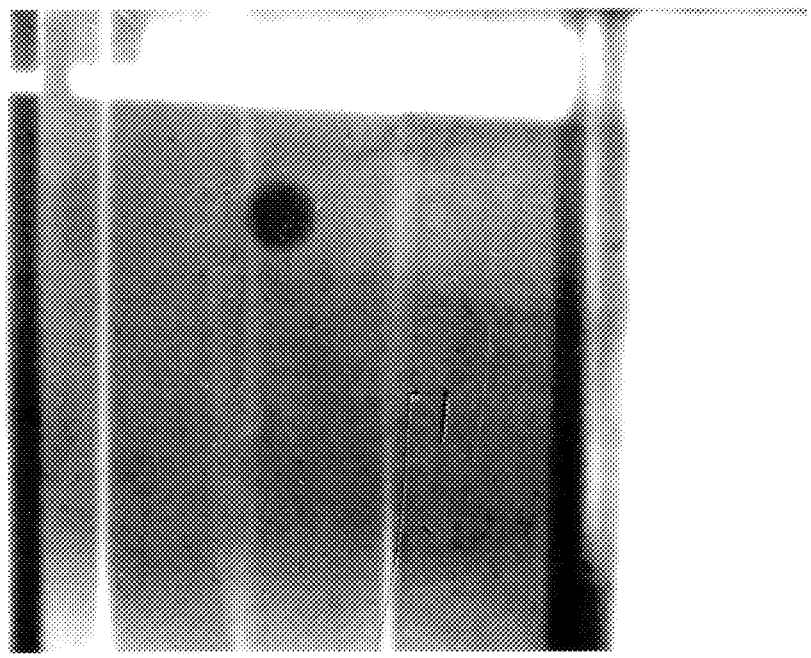
FIGS. 5, 6, and 7 are X-ray photographs showing the stages of the wounding body (in the form of a ball) passing through the target.
Figure 6:
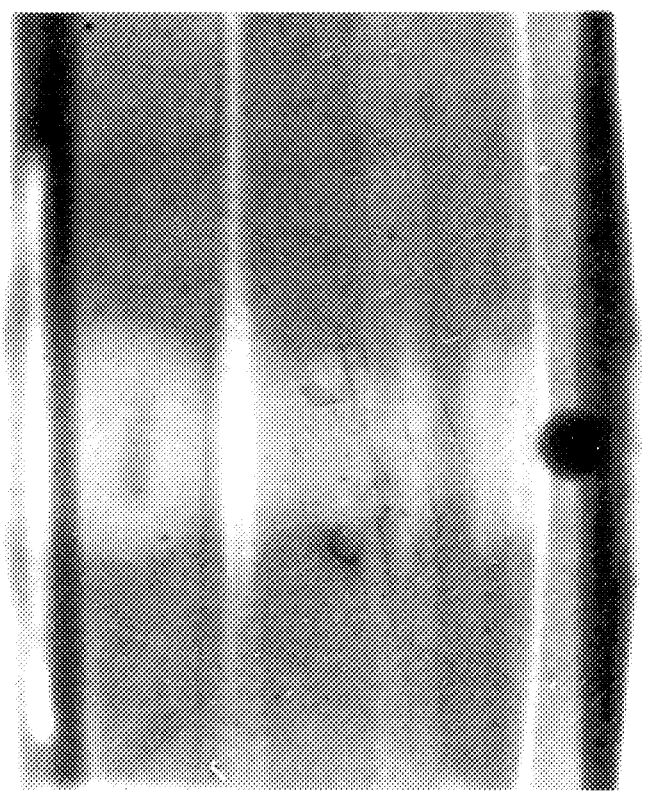
Figure 7:
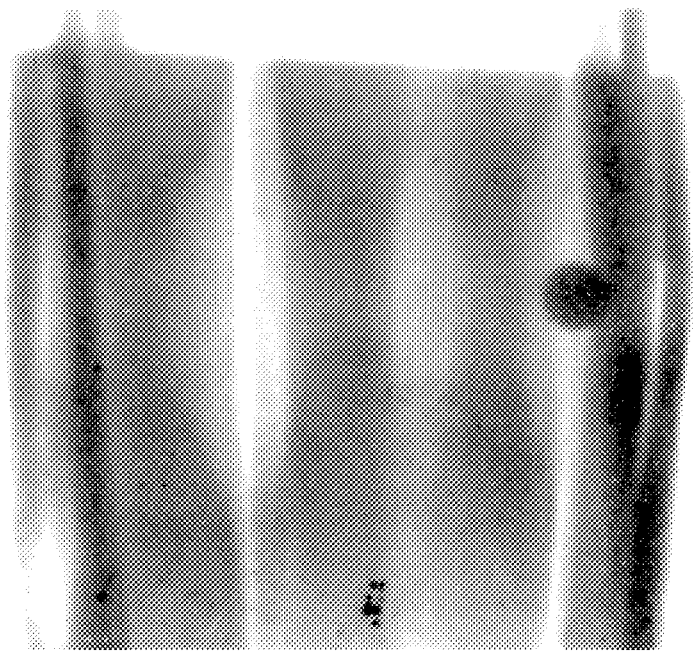

As a general case, the target comrises blocks 1, 2, and 3 to simulate the skin, muscle, and bone tissues, respectively. The blocks 1, 2, and 3 are of identical construction. Each block comprises a simulating section containing a layer 4 of a material, whose mechanical properties match those of the tissue to be simulated (skin, muscle, or bone) and a recording section composed of a layer 5 of a colorant-containing material, a layer 6 of a cellular material, and two substrates 7, with the layer 4 of the simulating section arranged in between the latter.

For skin tissue simulation, the layer 4 is made of vulcanized rubber, whose mechanical properties best approximate those of the skin tissue.

For muscle tissue simulation, the layer 4 is made of unvulcanized rubber, whose mechanical properties best approximate those of the muscular tissue.

For bone tissue simulation, the layer 4 is made of textolite, whose mechanical properties best approximate those of the bone tissue.

The specific characteristics of the skin, muscle, and bone tissues and those materials used to simulate them, are present in the table below.

It will be noted that apart from the afore-mentionned most similar materials, use may also be made of other materials to simulate the skin, muscle, and bone tissues. Thus, artificial leather may be employed to simulate the skin tissue, soap to simulate the muscular tissue, glass-reinforced textolite to simulate the bone tissue.

The colorant-containing material layer 5 is made of carbon paper or some other easily descructible material. The cellular-material layer 6 is made of a material of regular structure, thus of nylon-6 net For the substrate layers 7, a thin paper is used such as has a sufficiently high mechanical strength, e.g. tracing paper.

Blocks 1, 2, and 3 designed to simulate the skin, muscle, and bone tissues are fabricated separately and stored independent of one another. They can be made in any desired sizes. In order to fabricate a target to simulate a biological subject or some anatomical region thereof, the necessary number of blocks are selected and arranged in the succession to match that of the biological tissues. For each specific target, the number of blocks 1, 2, and 3 and the order of their arrangement may be different. Where anatomical regions with a thick layer of muscular tissues are to be simulated, the target will contain several muscle-simulating block arranged consecutively, one after another. The blocks are fastened together in a target by any conventional method, e.g. by means of a frame (omitted from the drawing).

The use of the target may be considered in a version where the anatomical region simulated is that of the top front part of the thigh of an adult man and contains skin, muscle, and bone tissues. In this specific case, the target contains blocks 1, 2, and 3 simulating said tissues.

The dynamic mechanical effect was produced using an unannealed steel ball of 0.007 m diameter and weighing 0.0078 kg, with the ball flying velocity being equal to 325 m/s. Under said conditions, the ball pierced the blocks 1 and 2 in the target and was embedded in the block 3. As the blocks 1 and 2 were pierced, a cavern was formed which proceeded to pulsate after the ball had been stopped in the block 3, this simulating the temporary pulsating cavity which is formed under said conditions in biological tissues. A moving body is known to cause a compact zone to be formed in front of it, and a trace of such a zone was recorded in the recording sections of the blocks 1, 2, and 3 as imprints of the colorant contained in the layers 5, transferred through the cells of the material of the layers 6 on the substrate layers 7. Concurrently, radial fissures were initiated in the substrate layers 7. Owing to the viscoelastic properties of the material of the layer 4 of the block 2, used to simulate the muscular tissue, the high stresses of the compact zone gave rise to high strains, with the initial radial fissures propagating and circular fissures being formed. The substantial difference in the coefficients of extension of the materials of the layer 4 and the layers 7 caused circular walls to be formed on the layers 7. Thus, the physical processes occurring in the simulating sections of the blocks 1, 2, and 3 were recorded on the substrates 7 of their recording sections as punctures, imprints, and initial radial fissures in the blocks 1 and 3 and as a puncture, an imprint, and a system of radial and circular fissures and circular walls in the block 2.

On completion of the test, the target was dismantled, and the traces obtained processed. For each of the blocks 1, 2, and 3, the maximum values of the parameters of the longitudinal compression wave were determined from the imprint size. The stressed-strained condition of the medium and the maximum magnitude of radial displacements of the temporary pulsating cavity were determined from the maximum dimensions of radial and circular fissures and circular walls. The position of the wounding projectile (ball) while passing through the target blocks was determined from the shape and orientation of the punctures. Thus, all the traces, in their totality, served to reconstruct the real picture of the dynamic mechanical effect of the ball upon the subject simulated.

INDUSTRIAL APPLICABILITY

The proposed target is capable of simulating, with a high degree of reliability, any anatomical region of a biological object exposed to a dynamic mechanical effect and of recording the traces left by the incident physical processes. The test results obtainable therewith are highly reliable. The use of the proposed target simplifies testing and data processing procedures. The target is simple in design and easy to fabricate.

TABLE

| Material | Ultimate strength, MPa | Modulus of elasticity, Pa | Relative density, kg/m$^3$ |
| --- | --- | --- | --- |
| Skin tissue | 0.29 | $1.2 * 10^4$ | $1.09 * 10^3$ |
| Vulcanized rubber | 95.0 | $1.8 * 10^4$ | $0.91 * 10^3$ |
| Muscular tissue | 1.97 | $4.0 * 10^6$ | $1.02 * 10^3$ |
| Synthetic rubber | 1.25 | $1.2 * 10^4$ | $0.91 * 10^3$ |
| Bone tissue | 106.0 | $3.6 * 10^6$ | $1.11 * 10^3$ |
| Textolite | 90.0 | $4.0 * 10^4$ | $1.3 * 10^3$ |

I claim:

1. A target comprising a means to simulate a biological subject, and characterized in that said means comprises a set of blocks to simulate the skin, muscle and bone tissues, said blocks being arranged consecutively, one after another, and each comprising a recording section composed of a layer of colorant-containing material, a layer of a cellular material, and two substrates, and a simulating section arranged in between said substrates and containing a layer of a material, whose mechanical properties best approximate those of the skin, muscle, or bone tissue.

2. A target as defined in claim 1, characterized in that vulcanized rubber is used for the material to simulate the skin tissue.

3. A target as defined in claim 1, characterized in that unvulcanized rubber is used for the material to simulate the muscular tissue.

4. A target as defined in claim 1, characterized in that textolite is used for the material to simulate the bone tissue.

* * * * *